Figure 1:
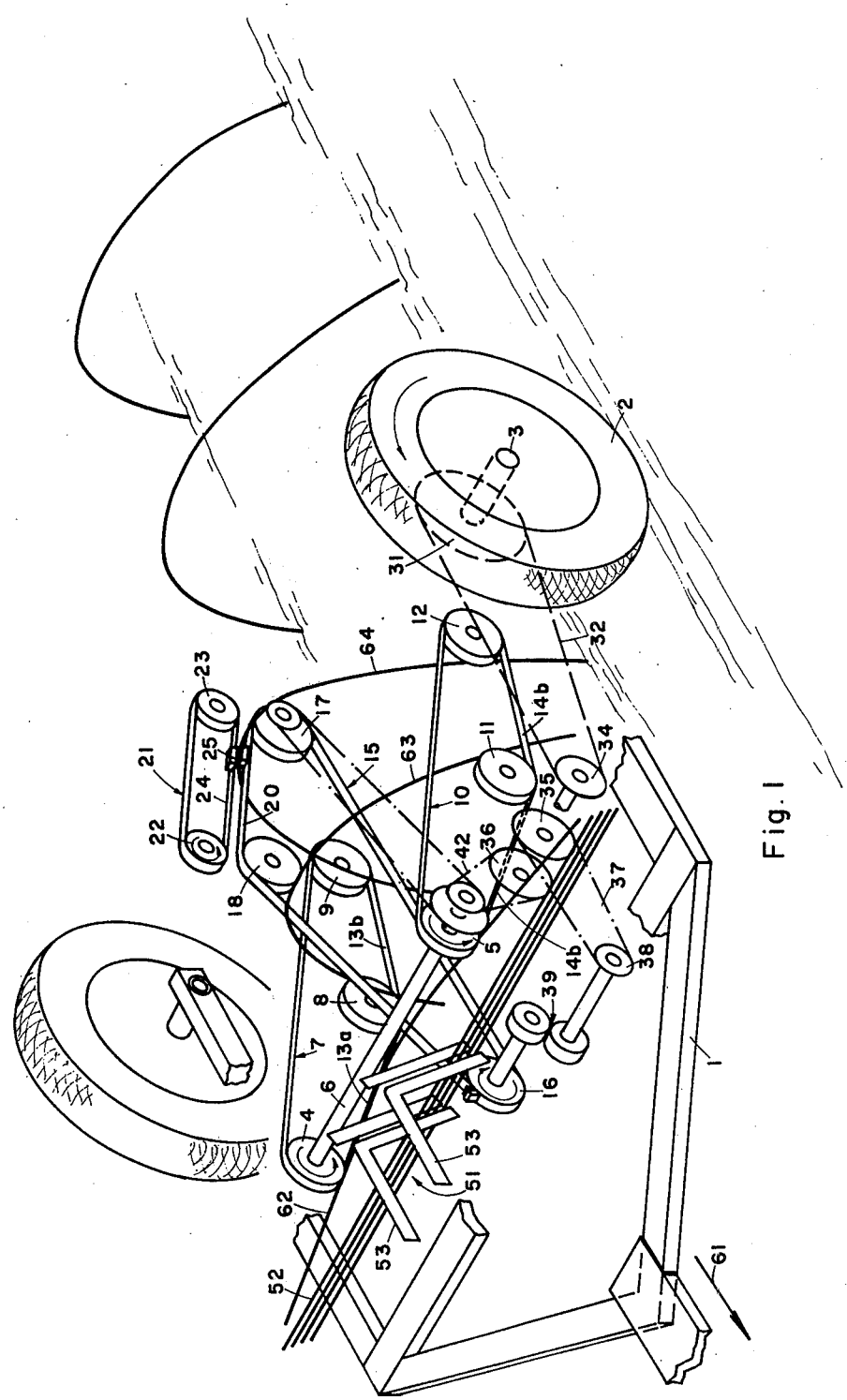

United States Patent [19]

Alper et al.

[11] 4,186,520
[45] Feb. 5, 1980

[54] LOW LEVEL CULTIVATION TUNNELS

[75] Inventors: Yekutiel Alper; Amikam Margolin, both of Rishon le'Zion, Israel

[73] Assignee: The State of Israel, Ministry of Agriculture, Jerusalem, Israel

[21] Appl. No.: 910,919

[22] Filed: May 30, 1978

[51] Int. Cl.² .............................................. A01G 13/02
[52] U.S. Cl. .......................................... 47/1 R; 47/2; 47/19; 111/1
[58] Field of Search .................. 47/1, 2, 9, 19, 26, 47/27, 28, 29, 30, 31, 32, 45, 46, 47, 58; 52/479; 264/320; 425/392; 111/1-3

[56] References Cited

U.S. PATENT DOCUMENTS

| 3,000,139 | 9/1961 | Bezzerides | 47/1 |
| 3,353,297 | 11/1967 | Gervais | 47/29 X |
| 3,661,481 | 5/1972 | Haviland et al. | 47/26 X |
| 3,945,330 | 3/1976 | Leavitt et al. | 47/9 X |

FOREIGN PATENT DOCUMENTS

| 2235642 | 3/1975 | France | 47/9 |
| 685457 | 1/1953 | United Kingdom | 47/29 |
| 436641 | 1/1975 | U.S.S.R. | 47/29 |

Primary Examiner—Edgar S. Burr
Assistant Examiner—James R. Feyrer
Attorney, Agent, or Firm—Ladas, Parry, Von Gehr, Goldsmith & Deschamps

[57] ABSTRACT

Apparatus for forming and mounting in position wire arch supports for low level cultivation tunnels comprising in combination: a support chassis provided with or adapted to be coupled to drive means for displacing the apparatus in a given direction and rate; arch forming means carried by the chassis for forming arch supports from arch wire blanks; and arch displacing means carried by the chassis for imparting to each arch a displacement having a first component of the given rate and being directed opposite to the given direction and substantially normally to the plane of the arch and a second component directed downwardly and in the plane of the arch.

12 Claims, 3 Drawing Figures

LOW LEVEL CULTIVATION TUNNELS

The present invention relates to low level cultivation tunnels.

Such tunnels have been increasingly used in agriculture in recent years and involve the placing, over seeded rows, of tunnels formed of polyethylene sheeting or similar, substantially translucent sheet materials having a required degree of sturdiness. The provision of such tunnels has been found to provide a favourable environment for the growing seedlings.

The forming of the tunnel over the seeded row involves preparing and placing in position wire support arches which are inserted into the ground at spaced apart intervals, the sheet covering being then spread over and anchored to the arches.

Hitherto these arches, after having been formed, have been manually inserted in the ground and this has rendered the construction of the cultivation tunnels expensive and time consuming.

Proposals for the mechanisation of the arch insertion have been made and involve the provision of a pneumatically driven mechanism carried by a suitable chassis and drawn over the seed row to be covered. This mechanism is provided with an air compressor having a suitably shaped jaw which receives a preshaped wire arch at the first part of a stroke, carrying the arch with it and inserting it into the ground during the second part of the stroke and releasing the arch after insertion at the bottom end of the stroke. The use of this hitherto proposed mechanism has been found to involve substantial difficulties particularly in view of the fact that insertion of the arch into the ground takes place whilst the arch is being displaced with respect to the ground. In an attempt to minimize the effect of these difficulties, the stroke rate has had to be substantially raised whilst at the same time the rate of displacement of the mechanism with respect to the ground must be kept low. Such a pneumatically operating mechanism which has to operate at such a relatively high stroke rate turns out to be rather bulky for convenient transport and use. Furthermore the operation of this mechanism is in accordance with a fixed predetermined cycle. Thus, with such cyclic operation, the start of a new cycle cannot take place before the end of the previous cycle and in consequence the operation of the mechanism is accompanied by "dead time" periods which considerably slows down the operation of the mechanism.

It is an object of the present invention to provide apparatus for forming and mounting in position wire arch supports for low level cultivation tunnels in which the above referred to difficulties or disadvantages are substantially overcome or avoided.

According to the present invention there is provided apparatus for forming and erecting in position wire arch supports for low level cultivation tunnels comprising in combination:
 a. a support chassis provided with or adapted to be coupled to drive means for displacing said apparatus in a given direction and rate,
 b. arch forming means carried by said chassis for forming arch supports from arch wire blanks, and
 c. arch displacing means carried by said chassis for imparting to each arch a displacement having a first component of said given rate and being directed opposite to said given direction and substantially normally to the plane of the arch and a second component directed downwardly and in the plane of the arch.

Thus, with apparatus in accordance with the present invention and, by ensuring that the formed arch, during its insertion into the ground is being moved oppositely to the direction of displacement of the apparatus as a whole and, at the same rate as that displacement, the downwardly descending arch support remains effectively stationary with respect to the ground into which it has to be inserted. As a consequence insertion can be readily, accurately and continuously effected by relatively simply means, without putting an untoward limit on the rate of displacement of the apparatus as a whole and without the time wasting aspects of "cyclic" operation.

According to a preferred embodiment of the present invention the arch displacing means comprises a pair of endless belts respective stretches of which are disposed parallel to each other sloping downwardly in said opposite direction, belt drive means being provided for driving the belts so as to displace them in synchronism in said opposite direction, said belt stretches being respectively provided with arch gripping members which are displaceable with the belts and are adapted to grip an arch and constrain it into a downward displacement in its own plane.

Preferably the arch forming means comprises transport means adapted to engage and transport a median portion of each arch wire blank in a given sense, and constraining means located respectively on either side of the transport means and adapted respectively to engage opposite ends of each wire blank so as to inhibit their displacement in said given sense.

Figure 2:
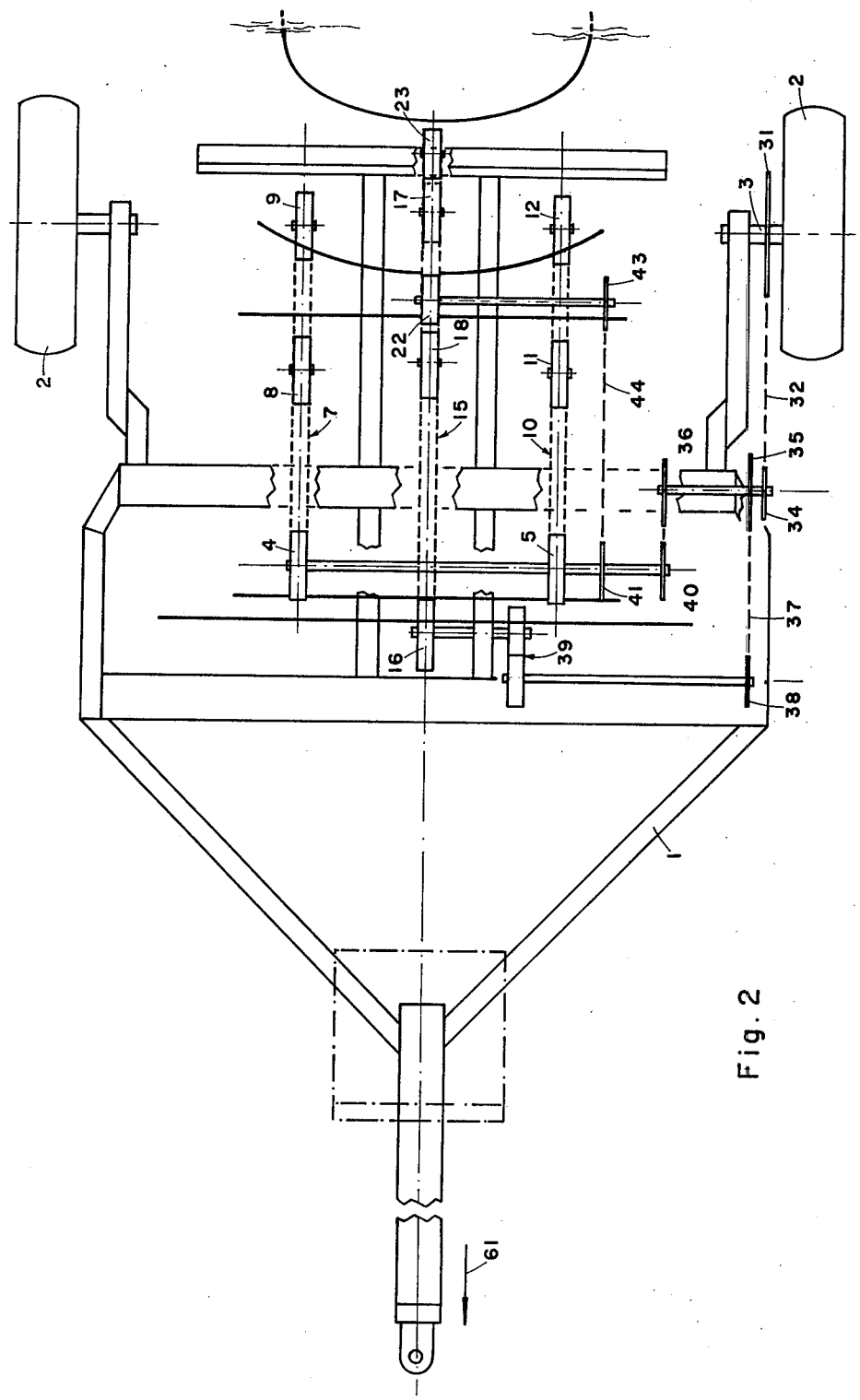
Figure 3:
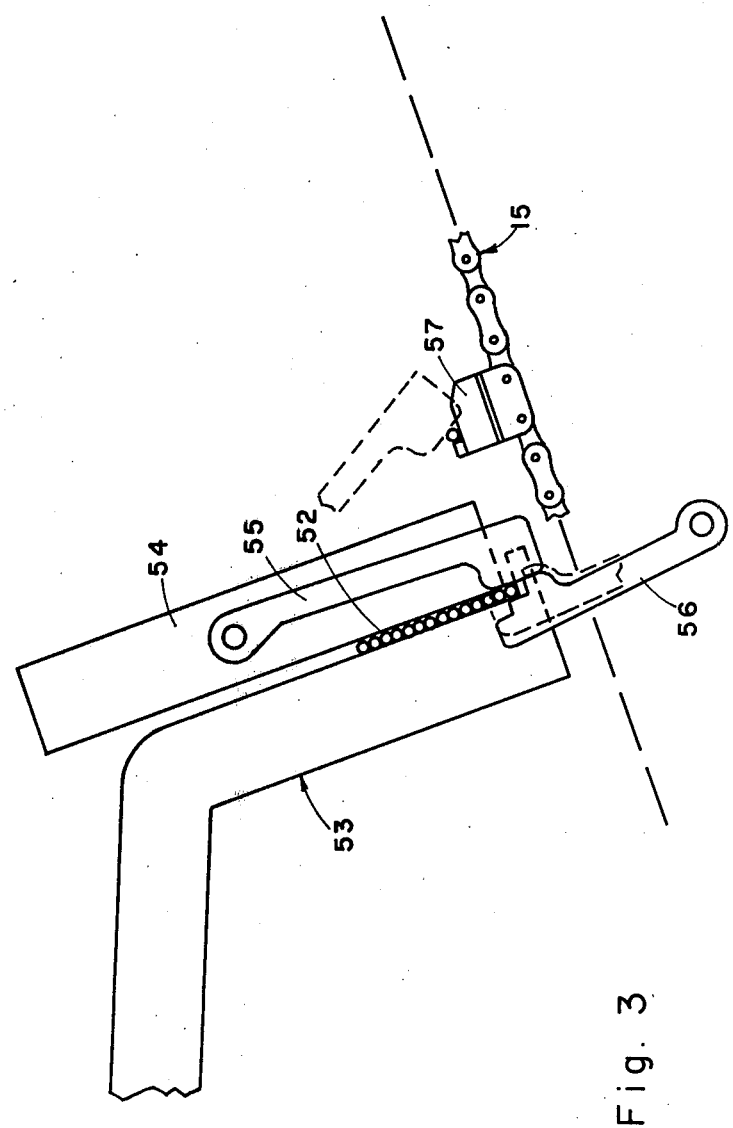

One embodiment of apparatus for forming and mounting in position wire arch supports for low level cultivation tunnels in accordance with the present invention will now be described by way of example and with reference to the accompanying drawings in which:

FIG. 1 is a schematic perspective view of the apparatus in accordance with the invention, FIG. 2 is a plan view from above of the apparatus shown in FIG. 1, and FIG. 3 is a side elevation of a detail of the apparatus shown in FIGS. 1 and 2 on an enlarged scale.

As seen in FIGS. 1 and 2 of the drawings the apparatus comprises a chassis 1 mounted on a pair of wheels 2 via an axle 3. A pair of sprocket wheels 4 and 5 are respectively keyed onto an axle 6 which is in its turn journalled (by means not shown) with respect to the chassis 1. An endless chain belt 7 passes around the sprocket wheel 4, under a sprocket wheel 8 and around a sprocket wheel 9. Similarly an endless chain belt 10 passes around the sprocket wheel 5 under a sprocket wheel 11 and around a sprocket wheel 12. The chain belts 7 and 10 constitute constraining means formed by fourth and fifth end less belts respectively. The sprocket wheels 8 and 11 and 9 and 12 are all rotatably mounted (by means not shown) with respect to the chassis 1. As seen in the drawings the disposition of the sprocket wheels 4, 8, 9 and 5, 11, 12 is such as to define, inter alia, pairs of successive belt stretches 13a, 13b and 14a, 14b.

Located substantially equidistantly between the chain belts 7 and 10 and parallel thereto is a chain belt 15 constituting first and third endless belts located substantially along the longitudinal axis of the chassis 1. The opposite longitudinal extremities of the belt 15 pass respectively over sprocket wheels 16 and 17, an intermediate portion of the belt passing over a sprocket wheel 18. The sprocket wheels 16, 17 and 18 are all rotatably mounted (by means not shown) with respect to the chassis 1. The portion of the chain belt 15 between the sprocket wheels 16 and 18 defines an upwardly inclined belt stretch 19 constituting a stretch of a third endless belt whilst the subsequent portion of the chain belt 15 between the sprocket wheels 18 and 17 defines a downwardly inclined belt stretch 20 constituting a first stretch of a first endless belt.

An endless chain belt 21 constituting a second endless belt located above and in the plane of the chain belt 15 extends between a pair of sprocket wheels 22 and 23 rotatably mounted (by means not shown) with respect to the chassis 1. Defined between the sprocket wheels 22 and 23 is a lowermost belt stretch 24 constituting a first stretch of the second endless belt parallel to and slightly spaced away from the belt stretch 20. The endless belt 21 carries a clamping pad 25 constituting an arch gripping member.

A drive is transmitted to the various chain belts from the chassis wheels 2 via a transmission which is schematically shown in FIGS. 1 and 2 of the drawings. Thus, the wheel motion is transmitted from the wheel 2 to a coaxially mounted pulley 31 and from there via a drive belt 32 to three coaxially mounted pulleys 34, 35 and 36. A drive belt 37 transmits the drive of the pulley 35 to a pulley 38 from which the drive is transmitted via a pair of gear wheels 39 to the sprocket wheel 16.

As seen in FIG. 2, a pair of pulleys 40 and 41 are coaxially mounted with respect to the sprocket wheel 5, the movement of the pulley 36 being transmitted to the pulley 40 via a drive belt 42 whilst the movement of the pulley 41 is transmitted to a pulley 43 coaxially mounted with respect to the sprocket wheel 22, via a drive belt 44.

A magazine 51 for storing and dispensing elongated wire rods 52 which constitute blanks from which arches are to be formed is located above and adjacent to the sprocket wheel 16 and comprises a pair of angled bars 53 which are respectively juxtaposed by a pair of parallel spaced apart bars 54. As can be clearly seen in FIG. 3 of the drawings (only one set of bars 53, 54 being shown) the bars 53 and 54 are spaced apart sufficiently to accommodate a column of superimposed single wire rods 52. Pivotally mounted on each of the bars 54 is a stabilizing member 55 which is spring biased (by means not shown) in a clockwise direction. Pivotally mounted (with respect to the chassis) below each set of bars 53, 54 is a rod support member 56 which is also spring biased (by means not shown) in a clockwise direction. The chain belt 15 is located between the two sets of bars 53, 54, support members 56 and stabilizing members 55 constituting constraining means. The belt is provided with an outwardly projecting rod engaging tooth 57 constituting engaging means. As can be seen the positioning of the rod support members 56 below the rods 52 ensures that the rods 52 do not fall downwardly.

The functioning of the apparatus just described in forming and inserting the support arches will now be described.

The chassis 1 is coupled to an appropriate traction such as, for example, a tractor and is displaced over a seeding row in the direction of the arrow 61. As indicated above the displacement of the chassis wheel 2 is transmitted by the transmission to the drive belts 15, 7, 10 and 21. When the rod engaging tooth 57 engages the lowermost rod 52 located in the magazine 51, this lowermost rod 52 is advanced on the belt stretch 19 against the counteracting biasing force exerted by the stabilizing bars 55 located on either side of the belt stretch 19 and in this way the displacing rod is maintained stable in a substantially horizontal condition. With the counterclockwise, pivotal displacement of the stabilizing bars 55 into the position shown in broken lines in FIG. 3 the support bar 56 moves into the position shown in broken lines in FIG. 3 and prevents the downward falling of the stored rods.

By the time the displaced rod has reached the adjacent extremities of the chain belts 7 and 10 these latter extremities take over the stabilizing function of the stabilizing bars 55 which now pivot backwards into the position shown in full lines in FIG. 2 of the drawings.

The rod is now in the position 62 shown in FIG. 1 of the drawings and the continued, upward displacement of the median portion of this rod, engaged as it is by the engaging tooth 57 carried by the stretch 19 of the chain belt 15 and the engagement of the end portions of the rod with the constraining stretches 13a, 13b; 14a, 14b of the belts 7 and 10 results in the arching of the rod as shown clearly in the position 63 in FIG. 1 of the drawings. It will be appreciated that the engagement of the end portions of the rod with the side belts 7 and 10 prevents slipping of these end portions with respect to these side belts but on the other hand the displacement of these side belts at a rate corresponding to the displacement of the central belt 15 has the consequence that, at the same time as the arching takes place the arch is transported in a sense opposite to the direction of advance of the chassis.

When the arch has reached the uppermost reach of the belt 15, i.e. above the pulley 18, the synchronized displacement of the belt 21 ensures that the clamping pad 25 engages with the engaging tooth 57 thereby firmly clamping in position the now fully formed, vertically disposed arch. The arch is now displaced downwardly along the downwardly directing slopes of the belt stretches 20 and 24 whilst, at the same time, the arch as a whole is displaced in a direction opposite to that of the direction of advance of the chassis and at a rate equal to the rate of advance of the chassis. As a consequence there is effectively no relative motion between the downwardly displaced arch (as seen in position 64) and the ground into which the arch is effectively inserted as a consequence of its downward displacement.

Successive arches are formed and inserted in the same manner, the spacing apart of the inserted arches being a function of the distribution of the engaging teeth on the central belt 15.

The degree of insertion of the arches is a function, inter alia, of the height of the apparatus above the ground and means are provided (not shown) for varying this height.

It will be appreciated that what has been described constitutes a simple and highly effective and economical way of forming and inserting arches for low level tunnel cultivation. It will be particularly realised that by virtue of the fact that the arch, as it is inserted is maintained relatively stationary with respect to the ground, the equipment for insertion is particularly effective and simple.

We claim:

1. Apparatus for forming and mounting in position wire arch supports for low level cultivation tunnels comprising in combination:

a. a support chassis adapted to be coupled to drive means for displacing said apparatus in a given direction and rate,
b. arch forming means carried by said chassis for forming arch supports from arch wire blanks, and
c. arch displacing means carried by said chassis for imparting to each arch a displacement having a first component at said given rate and being directed opposite to said given direction and substantially normally to the plane of the arch and a second component directed downwardly and in the plane of the arch.

2. Apparatus according to claim 1 wherein said arch displacing means comprises a first endless belt, a first stretch of said first belt sloping downwardly in said opposite direction, belt drive means for driving said belt so as to displace said first stretch in said opposite direction, arch retaining means juxtaposed with respect to said first stretch and displaceable in synchronism therewith for constraining said arch into a downward displacement in its own plane.

3. Apparatus according to claim 2 wherein said arch retaining means comprises a second endless belt having a first stretch thereof disposed substantially parallel to the first stretch of the first belt and displaceable in synchronism therewith, said first stretches of said first and second belts being respectively provided with arch gripping members.

4. Apparatus according to claim 1 wherein said arch forming means comprises transport means adapted to engage and transport a median portion of each arch wire blank in a given sense, and constraining means located respectively on each side of said transport means and adapted respectively to engage opposite ends of said wire blank so as to inhibit their displacement in said given sense.

5. Apparatus according to claim 4 wherein said transport means comprises a third endless belt having a stretch thereof adapted to move at least in said given sense, engaging means associated with said third belt and adapted to engage said median portion.

6. Apparatus according to claim 4 wherein said third endless belt has a further stretch adapted to move in said opposite direction towards said arch forming means.

7. Apparatus according to claim 6 wherein said constraining means are respectively displaceable in said given direction and are respectively provided with engaging means adapted to engage the end portions of each wire blank.

8. Apparatus according to claim 6 wherein said constraining means respectively comprise respective stretches fourth and fifth endless belts two stretches which are respectively displaceable in said opposite direction.

9. Apparatus according to claim 8 wherein at least said fourth and fifth endless belts are constituted by chains said wire blank end portions being respectively engageable by inter-link portions of said chains.

10. Apparatus according to claim 3 wherein said transport means comprises a third endless belt having a first stretch thereof adapted to move at least in said given sense, engaging means associated with said third belt and adapted to engage said median portion, said first and third endless belts together constituting a single continuous belt having successive stretches thereof angularly disposed with respect to each other and constituting respectively said first stretches of said first and second belts.

11. Apparatus according to claim 1 wherein said chassis is mounted on wheels and is furthermore provided with transmission means coupled on the one hand to said wheels and on the other hand to said belts whereby said belts are driven in synchronism with the movement of said wheels.

12. Apparatus according to claim 4 wherein there is furthermore provided an arch wire blank magazine adapted to accommodate said blanks substantially normally with respect to said given direction and sense, an outlet of said magazine disposed adjacent said transport means and adapted to dispense separate wire blanks to said transport means.

* * * * *